United States Patent [19]

Purdy, III

[11] Patent Number: 5,137,202
[45] Date of Patent: Aug. 11, 1992

[54] PIPE JOINT LEAD STOP AND METHOD

[76] Inventor: Robert J. Purdy, III, 170 Prospect Ave., Ste. C, Buffalo, N.Y. 14201

[21] Appl. No.: 731,107

[22] Filed: Jul. 15, 1991

[51] Int. Cl.$^5$ ................................................ B23K 1/00
[52] U.S. Cl. ................................ 228/132; 228/216; 228/50; 285/287
[58] Field of Search ............... 228/132, 134, 154; 216, 228/50, 44.5; 285/287

[56] References Cited

U.S. PATENT DOCUMENTS

| | | | |
|---|---|---|---|
| 3,528,688 | 9/1970 | Stenerson | 228/216 |
| 3,963,162 | 6/1976 | Taguchi et al. | 228/134 |

Primary Examiner—Samuel M. Heinrich
Attorney, Agent, or Firm—Hodgson, Russ, Andrews, Woods & Goodyear

[57] ABSTRACT

An article for providing a barrier between solder in a piping joint and the interior of the piping joint so that drinking water flowing therethrough is not contaminated by lead particles resulting from water flow erosion of the solder. The barrier article comprises an annular member a portion of which engages the inner surface of an inner pipe portion and a radially outwardly extending portion of which engages the end of the inner pipe portion and extends radially beyond the outer surface of the inner pipe portion to act as a barrier between solder in the annulus between the inner and an outer pipe portion and the interior of the joint. An indicator may be provided on the inner pipe portion adjacent the joint to assure the user of the piping system that the article was installed. In order to insure that an indicator is installed each time a barrier article is installed, the indicator and article may be marketed as a unit wherein each is attached to a respective end of a spacer, which is removed prior to soldering. The article may be press-fit within or integral with the outer pipe portion.

39 Claims, 4 Drawing Sheets

PIPE JOINT LEAD STOP AND METHOD

The present invention relates generally to pipe joints. More particularly, the present invention relates to pipe joints such as for drinking water or fresh water piping wherein an inner pipe or fitting portion and an outer pipe or fitting portion are fitted together in overlapping relationship and the annulus therebetween is filled with solder to bond the piping portions together.

Solder, which is commonly used to bond fresh water or drinking water pipes together, is commonly an alloy of lead and tin which is melted to flow into the annulus between the pipe end portions and allowed to harden and thereby bond the pipes together. While lead piping is generally no longer used for drinking water lines, solder containing lead remains in common use for forming the pipe joints. The public is becoming increasing aware of the potentially serious health hazard due to water flow erosion of lead solder in pipe joints resulting in minute lead particles contaminating drinking water. Cadmium or other materials in other solders may also contaminate drinking water. It is therefore considered desirable to prevent solder erosion so as to eliminate this source of lead or other contamination in drinking water.

Various methods have been proposed for protecting metal surfaces or the like during soldering or welding processes. Thus, Jennings et al U.S. Pat. No. 2,473,887 discloses the application to the surface of members to be soldered a specific liquid composition containing a polymeric organosilicon oxide binder and a refractory inorganic substance in order to control the flow of solder. Ahmann et al U.S. Pat. No. 4,457,466 discloses a mask for protecting tab contacts for circuit boards wherein a first fold slips over the tabs and is frictionally held in place while a second fold deflects away the solder wave. Ringsmith U.S. Pat. No. 2,625,450 discloses a roller bearing wherein an O-ring is used to prevent the passage of flash particles from a weld into the space between roller races. Young U.S. Pat. No. 1,931,311 discloses a soldered or brazed radiator joint wherein a stop of dissimilar material is adapted to fit into a depression to prevent flow of the bonding material into the header. Greene U.S. Pat. No. 1,939,772, Wagner, U.S. Pat. No. 1,980,561, Kershaw U.S. Pat. No. 1,990,077 and Thompson U.S. Pat. No. 2,646,995 disclose various brazed or welded butted pipe joints which include backing members inside the joints for support and/or as a barrier to the entrance of bonding material into the interior of the pipe. None of these references teach or suggest a solution to the problem of solder erosion in pipe joints which have a pair of overlapping pipe end portions soldered together.

It is accordingly an object of the present invention to prevent solder erosion in fresh water or drinking water piping systems and the like.

In order to prevent such solder erosion, in accordance with the present invention an annular member is provided which is fitted to an inner pipe or fitting portion, a portion on the annular member abuts an end of the inner pipe or fitting portion and extends radially outwardly beyond the outer surface of the inner pipe or fitting portion to provide a barrier between the annulus between the inner and outer pipe portions and the joint interior. The annular member may be press-fitted within or integral with an outer pipe or fitting portion to which the inner pipe or fitting portion is attached.

The foregoing and other objects, features, and advantages of the present invention will become more apparent from the following detailed description thereof taken in conjunction with the accompanying drawings in which a preferred embodiment of this invention is illustrated.

DETAILED DESCRIPTION OF THE PREFERRED EMBODIMENTS

Figure 1:
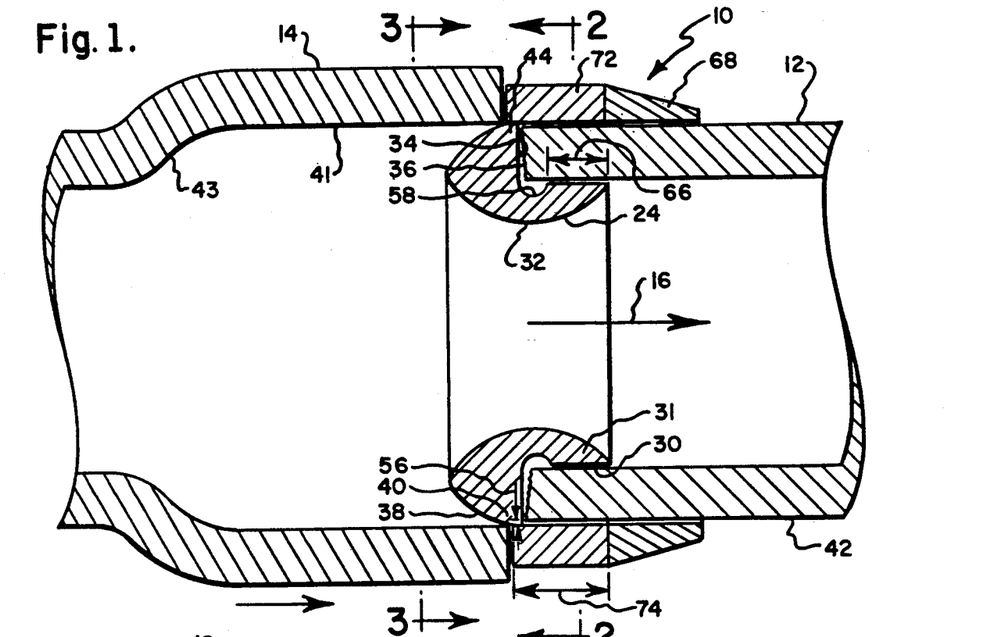
FIG. 1 is a longitudinal cross-sectional view of a pipe joint in accordance with the present invention, the pipe joint being assembled.
Figure 2:
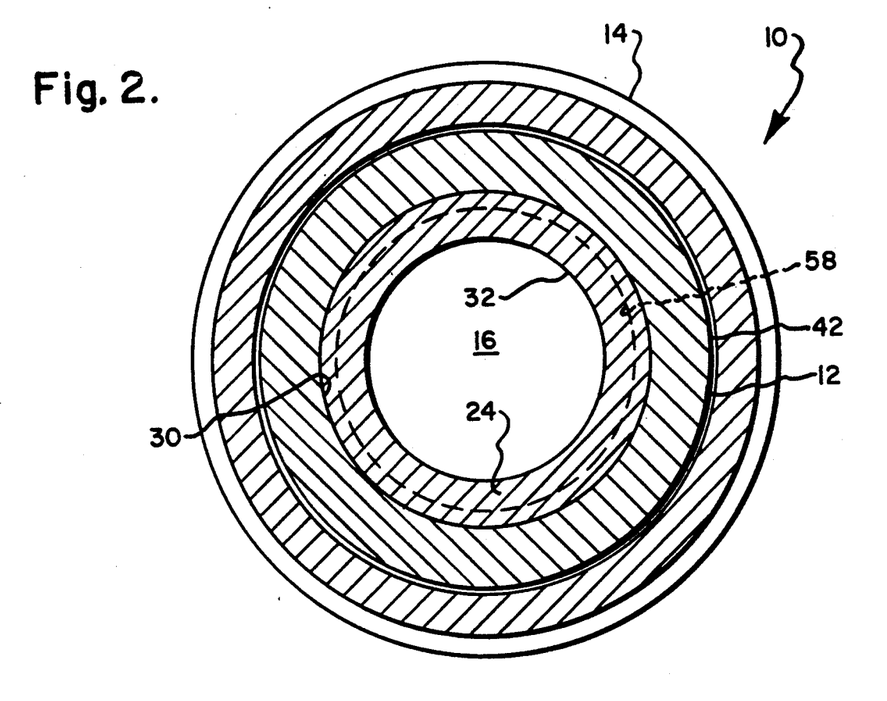
FIG. 2 is a sectional view of the embodiment as shown in FIG. 1 taken along lines 2—2 thereof.
Figure 3:
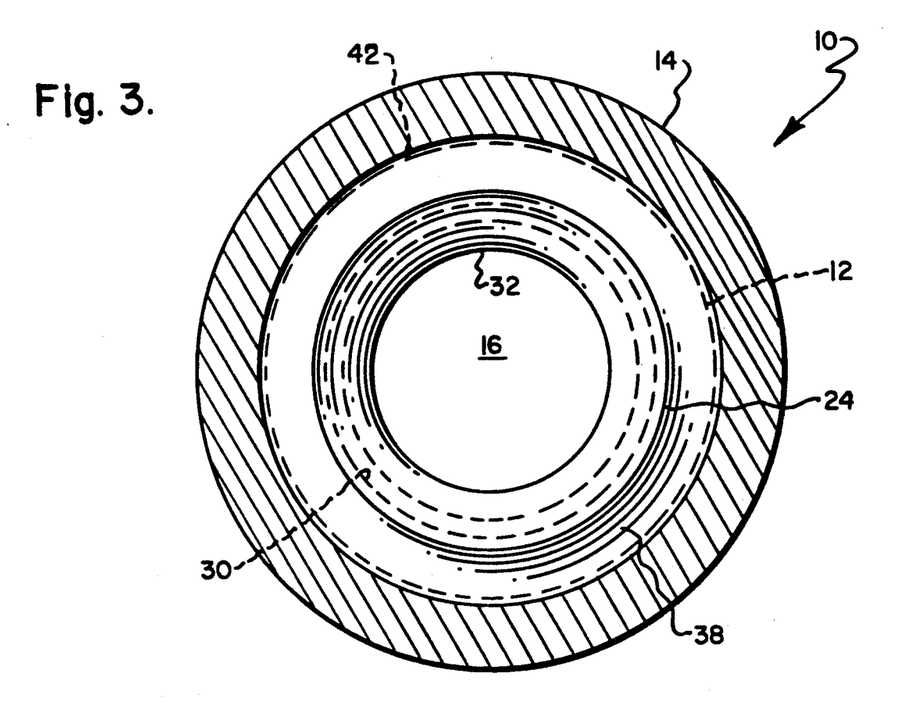
FIG. 3 is a sectional view of the embodiment as shown in FIG. 1 taken along lines 3—3 thereof.
Figure 4:
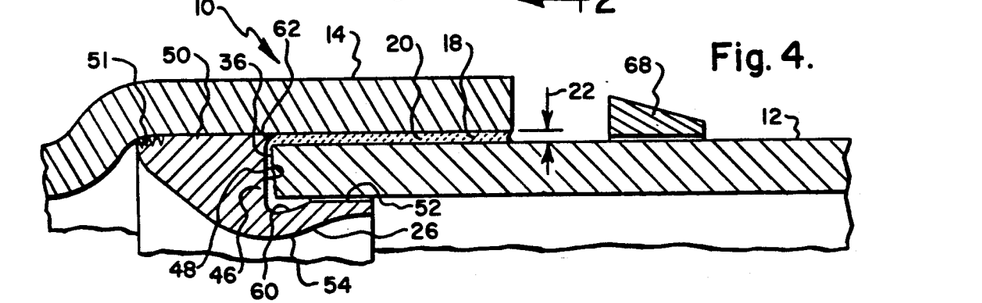
FIG. 4 is a half longitudinal sectional view, of an assembled and soldered pipe joint, illustrating an alternative embodiment of the present invention, it being understood that the other half of the sectional view is substantially identical to that shown.
Figure 5:
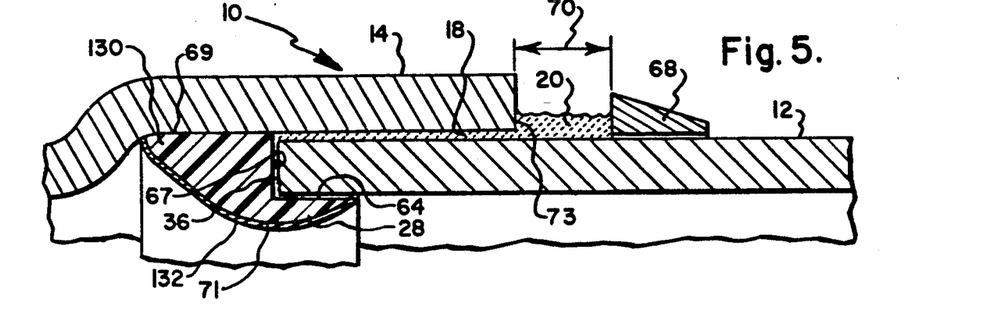
FIG. 5 is a view similar to that of FIG. 4, of an assembled pipe joint being soldered, illustrating yet another embodiment of the present invention.

Referring to FIGS. 1 to 3, there is illustrated generally at 10 a pipe joint in the process of being assembled wherein an end portion 12 of one pipe is fitted within the end portion 14 of another pipe and bonded thereto by flowing molten solder into the annulus therebetween and allowing the solder to harden. As used herein, the term "pipe end portion" or "pipe portions" are meant to include end portions of pipe fittings such as T-fittings or elbows. The pipes may, for example, be copper pipes. Thus, when assembled, joint 10 will be as shown in FIG. 4 wherein end portion 12 is fitted within end portion 14 and bonded thereto by filling the annulus, illustrated at 18, therebetween with molten solder 20, as illustrated in FIG. 5, and allowing the solder 20 to harden. For the purpose of this specification and the claims, "solder" is meant to include any substance which is used to bond a pair of pipe end portions together and which contains lead, cadmium, or any other substance which is a potential health or other hazard if, by water flow erosion or otherwise, it contaminates fresh or drinking water or other fluid flowing therethrough. The gap width, illustrated at 22 in FIG. 4, between the overlapping pipe portions 12 and 14, which is one-half of the difference between the inner diameter of the outer pipe portion 14 and the outer diameter of the inner pipe portion 12, may typically be perhaps about 0.005 to 0.010 millimeters. Like reference numerals will refer to like piping parts for joint 10 throughout FIGS. 1 to 7, though the lead stops therefor will vary and will therefore have different reference numerals.

Water flow through the joint 10 is illustrated at 16. If the hardened solder is in contact with the water flow, the flow of water past the hardened solder will erode the solder resulting in minute lead (or other harmful)

particles contaminating the drinking water. In order to provide a barrier between the solder 20 and the interior of the pipe joint 10 so that such undesirable water flow erosion does not occur, in accordance with the present invention an article 24, which may be called herein a "lead stop", is provided to block the annulus 18 and prevent the solder 20 from flowing to the interior of the pipe joint 10 where it may be eroded by the water flow and so that contact of the solder by the water flow is otherwise prevented. Alternative embodiments of the lead stop 24 for the pipe joint 10 are shown at 26 and 28 in FIGS. 4 and 5 respectively and at 80 and 102 in FIGS. 6 and 8 respectively. Unless otherwise specified or illustrated herein, a reference to one of the articles 24, 26, 28, 80, and 102 is meant to also be applicable to the others.

Article 24 is an annular member generally in the form of a washer or a modified O-ring which has a cylindrical surface, illustrated at 30, defining the outer surface of an axially inner portion 31 thereof. The diameter of surface 30 is substantially equal to the inner diameter of the inner pipe portion 12 so that the article 24 may be press fit to the pipe portion 12 and may, if desired, be also suitably bonded thereto. Article 24 has an annular inner surface 32 which defines a passageway therethrough for water flow 16 through the joint. Surface 32 extends from the axially inner end of surface 30 in a converging, then diverging, manner axially outwardly beyond the outer end of cylindrical surface 30. Unless otherwise specified, the terms "axially" and "radially", as used herein, are with reference to the inner pipe portion and with the article 24 inserted therein as shown in the drawings. A surface 34, which is axially outwardly of surface 30, extends radially outwardly of surface 30 to abut or engage the end 36 of inner pipe portion 12 when the article 24 is installed thereon. Finally, a surface 38 on the article 24 extends axially inwardly and radially outwardly from the axially outer end of surface 32 to the radially outer end of surface 34. Thus, the article 24 may be said to have two portions, a first portion 31 for press fitting in the inner pipe portion 12 to provide a means of attachment of the article 24 and a second portion 40 which is axially outwardly of the first portion 31 and which extends radially outwardly beyond the first portion 31 for purposes to be described hereinafter.

In order to provide a barrier between the annulus 18 and the interior of joint 10 so that water flow erosion of the solder which may contaminate drinking water flowing therethrough may be prevented, in accordance with the present invention the radially outwardly extending portion 40, defined between surfaces 34 and 38 and the axially outer portion of surface 32, is sized to extend radially outwardly beyond the outer surface 42 of the inner pipe portion 12.

Referring to FIG. 1, in accordance with a preferred embodiment of the present invention second portion 40 extends radially outwardly a distance which is sufficient, when the article 24 is applied to the inner pipe portion 12, to engage the inner surface 41 of the outer pipe portion 14 such that outer pipe portion 14 frictionally slides over or rubs against the radially outer article portion 40 as the pipe portions 12 and 14 are fitted together whereby a snug interference fit is obtained between article portion 40 and the outer pipe portion 14 for blocking the annulus 18 and the flow of solder 20 from the annulus 18 to the joint interior. Because the surface 38 extends radially inwardly as well as axially outwardly from the radially outer end of surface 34, a small tip, illustrated at 44, of the article 24 is provided to engage the outer pipe portion 14 during insertion of the inner pipe portion 12 therein with the result that a clearance is provided between the remainder of the surface 38 and the outer pipe portion 14 during such insertion. This minimizes resistance to such insertion to allow the article 24 to be more easily installed in the joint while effectively positioning the tip 44 to block the annulus 18 and providing sufficient structural support for the tip 44. The surface 38 is preferably contoured so that it generally conforms to the outwardly flared inner surface portion 43 of the pipe containing the outer pipe portion 14, whereby in the completed joint with the inner pipe portion fully inserted in the outer pipe portion, the surface 38 engages and generally conforms to the flared pipe surface 43 to further stop the flow of solder 20 to the joint interior.

In order to provide a suitable interference fit between the lead stop tip 44 and the outer pipe portion 14, the lead stop 24 is preferably composed of a material which is somewhat slippery by nature, relatively soft, non-polluting, and provides a tight fit. The lead stop 24 may, for example, be composed of a non-corrosive malleable metal such as a soft non-lead alloy bronze, a non-polluting plastic, or a soft ceramic refractory substance. In other words, the material of which the lead stop 24 is composed should be sufficiently malleable to deform as required for insertion of the inner pipe portion within the outer pipe portion. To provide such malleability, the material of which the lead stop 24 is composed has a durometer hardness which is preferably between about 70 and 300, more preferably between about 70 and 150. For an annulus gap 22 of about 0.005 mm, the surface 34 may extend, before insertion in the outer pipe portion, radially outwardly beyond the outer surface of the inner pipe portion 12 a distance, illustrated at 56, which is equal to at least about 0.005 mm.

The lead stop 26 of FIG. 4 has a radially extending second portion 46 having a radially extending surface 48, which is similar to radially extending surface 34 but which is sized to extend radially beyond the outer surface of the inner pipe portion 12 to a point just short of the inner surface 41 of the outer pipe portion 14 and has a surface 50 which, unlike surface 38, is generally cylindrical to provide a longer barrier between lead stop 26 and the outer pipe portion 14. Lead stop 26 also has a cylindrical surface 52, similar to surface 30, for engaging the inner surface of the inner pipe portion 12 and a converging/diverging surface 54, generally similar to surface 32. The surface 48 may extend radially outwardly beyond the outer surface of the inner pipe portion 12 to provide a friction or interference fit between the article 26 and the outer pipe portion 14.

The radially outer end portion of surface 48, i.e., the portion radially outwardly of the outer surface of the inner pipe portion 12, may extend axially inwardly whereby a radially outer and axially inner tip 62 of the lead stop 26 may project slightly into the annulus 18 in order to more effectively block the annulus.

In order to more effectively block the annulus, particularly where the hardness of the material of the article 26 is such as to require some compromise of the desired interference fit, the axially outer end portion of article 26, which engages the outer pipe portion along the flared surface portion 43 where the inner surface 41 begins to decrease in diameter, is provided with a plurality of serrations 51, having a depth of perhaps about ⅛ to 3/16 inch so that the tips thereof may embed in or deform to conform to the shape of flared surface portion 43.

In order to prevent misalignment of the lead stops 24 and 26 on the inner pipe portion 12 due, for example, to roughness in the cut of the pipe, annular indents 58 and 60 respectively are preferably provided in the surfaces 30 and 52 respectively at the axially outer ends thereof, i.e., at their respective intersections with radial surfaces 34 and 48 respectively.

The lead stop 28 of FIG. 5 includes cylindrical surface 64, radial surface 67, and surfaces 69 and 71, which are generally similar to surfaces 52, 48, 50, and 54 respectively of lead stop 26, but is not provided with an indent in surface 64, a plurality of serrations, or an axially inner tip. However, they may be provided, if desired. The lead stop 28 will be described in greater detail hereinafter.

Referring again to FIGS. 1 to 3, during the bonding process molten solder 20, stopped from flowing between the lead stop 24 and the outer pipe portion 14, may flow between the lead stop radial surface 34 and the end 36 of the inner pipe portion to be deposited, if it gets that far, in the indent 58 and might flow between the cylindrical surface 30 and the inner surface of the inner pipe portion 12. In order to ensure a tight fit of the lead stop 24 to the inner pipe portion 12 as well as to ensure against the escape to the joint interior of any molten solder between the surface 30 and the inner surface of the inner pipe portion, the surface 30 extends over a distance, illustrated at 66, which is preferably equal to between about 3/16 inch and ¼ inch.

It is contemplated that a lead stop such as described and shown herein would be placed at every soldered joint in a fresh or drinking water system, either hot or cold, and in any other system wherein it is desired to prevent contamination of fluid flowing therethrough by lead or other material in the bonding agent. It is also contemplated that such a lead stop may be used with generally any pipe size.

It is considered desirable that users of a fresh or drinking water piping system be assured that all of the joints 10 have been fitted with lead stops. In order to provide such assurance, in accordance with a preferred embodiment of the present invention an annular indicator, illustrated at 68, is provided on the inner pipe portion 12 and spaced a distance, illustrated at 70, from the end 73 of the outer pipe portion 14, which distance 70 may perhaps be equal to about ⅝" to ¾" to allow for the deposit of a pool of molten solder 20 for flowing into the annulus 18 for bonding of the pipe portions, as illustrated in FIG. 5. The indicator 68, which, for manufacturing convenience, may be composed of the same type of material as the lead stop is composed, is sized to provide a tight fit on the inner pipe portion 12 so that its position relative to the joint 10 is maintained so that it may be a reliable indicator yet the fit is not so tight as to result in difficulty in placing the indicator 68 thereon. Although the indicator 68 is shown to have a generally wedge shape, it may have any other suitable shape.

In order to assure that an indicator 68 is installed each time a lead stop is installed, the indicator 68 and lead stop 24 may be manufactured and sold as a single unit wherein the indicator 68 and lead stop 24 are each suitably bonded to opposite ends of a cylindrical spacer 72 the length, illustrated at 74, of which is equal to or greater than the desired length 70 between the indicator 68 and the end 73 of the outer pipe portion 14 when assembled. The spacer 72 may be composed of a stiff cardboard or other suitable material such as, for example, ¼" nts cardboard. The provision of the spacer 72 thus insures that an indicator 68 will be provided for a joint whenever a lead stop 24 is provided therein. The spacer 72 is preferably sufficiently stiff and has a sufficient circumferential thickness to push the indicator 68 into position as it is pushed by the outer pipe portion 14 during assembly.

In order to assemble the pipe joint 10 so that the solder 20 does not flow into the interior of the joint where it may be exposed to water flow erosion which may result in minute lead particles contaminating drinking water and to provide a barrier between the solder and the joint interior, the lead stop 24 and indicator 68 may, as previously discussed, be provided as a single unit bonded to opposite ends of cylindrical spacer 72. While so attached, the indicator 68 and spacer 72 are slipped over the inner pipe end portion 12 and the axially inner portion 31 of the lead stop 24 containing cylindrical surface 30 is press fitted to the inner surface of the inner pipe portion 12 whereby the lead stop portion 40 extends radially outwardly beyond the outer surface of the inner pipe portion 12. The inner pipe portion 12 with the lead stop 24 attached is then fitted within the outer pipe portion 14 with the malleable tip 44 being deformed as it is fitted within the outer pipe portion 14 to provide a tight fit therebetween, as discussed previously with reference to FIG. 1, and the bond between the spacer 72 and lead stop 24 broken and the spacer 72 and indicator slid along the outer surface of the inner pipe portion as the pipe portions are assembled in position for soldering. When the pipe portions are thusly assembled, the spacer 72 will have served its purpose. The bond between the spacer 72 and the indicator 68 may then be broken and the spacer 72 removed and discarded, leaving the space 70, which is equal substantially to the length 74 of spacer 72, between the indicator 68 and the outer pipe portion 14. Molten solder 20 may then be applied between the indicator 68 and the end of the outer pipe portion 14 to flow into the annulus 18 and harden to bond the inner and outer pipe portions 12 and 14 together, in accordance with principles commonly known to those of ordinary skill in the art to which this invention pertains, with assurance of a barrier between the solder and water flow in the joint.

The lead stop acts as a protective barrier or shield between the solder 20 in the annulus 18 and the joint interior so that the solder is not exposed to water flow erosion resulting in minute lead particles contaminating drinking water flowing therethrough. The pathway between the lead stop and the outer pipe portion 14 is blocked by the tight fit and/or jamming of the malleable material of the lead stop against the outer pipe portion, and the pathway between the surfaces 34 and 30 and the inner pipe portion 12 is also tortuous with little or no clearance between the cylindrical surface 30 and the inner pipe portion 12 to thereby further effectively block the flow of the molten solder.

By observing the indicator 68 near the joint 10, the user of the piping system can be assured that drinking water flowing therethrough is not being subjected to lead contamination due to the solder 20 used to form the joint. The indicator 68 and the lead stop 24 are provided as a single unit with the spacer 72 bonded therebetween to insure that the indicator 68 will be placed in position next to the joint 10 when the lead stop is placed in position to ensure against lead contamination of the drinking water.

Figure 6:
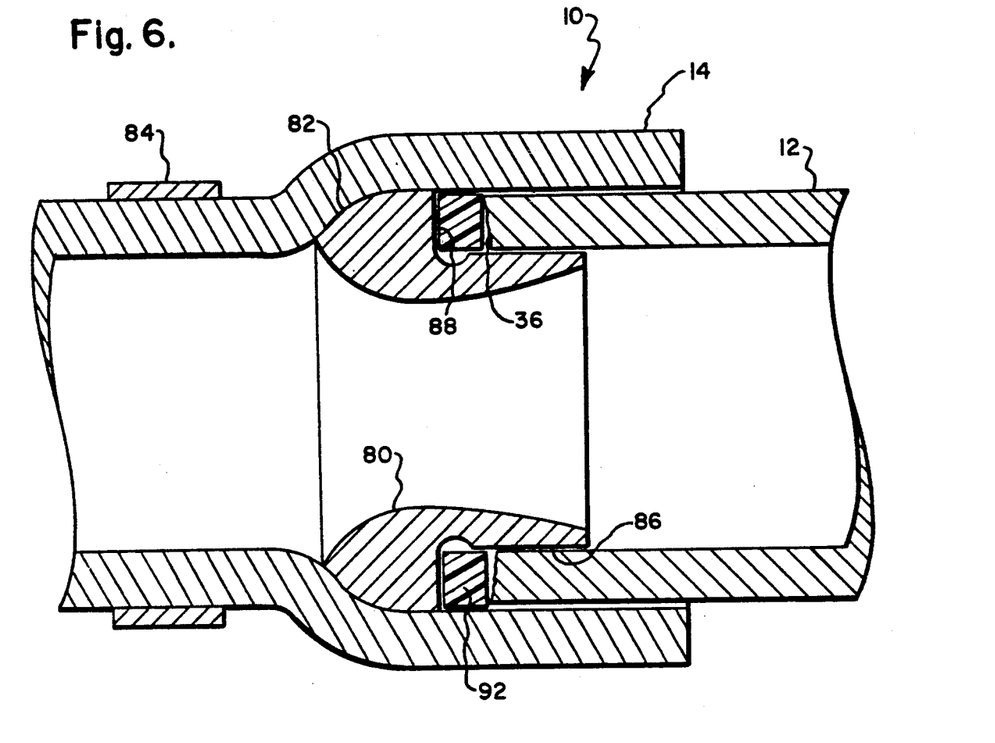
FIG. 6 is a view similar to that of FIG. 1 of another embodiment of the present invention, the pipe joint thereof in the process of being assembled.
Figure 7:
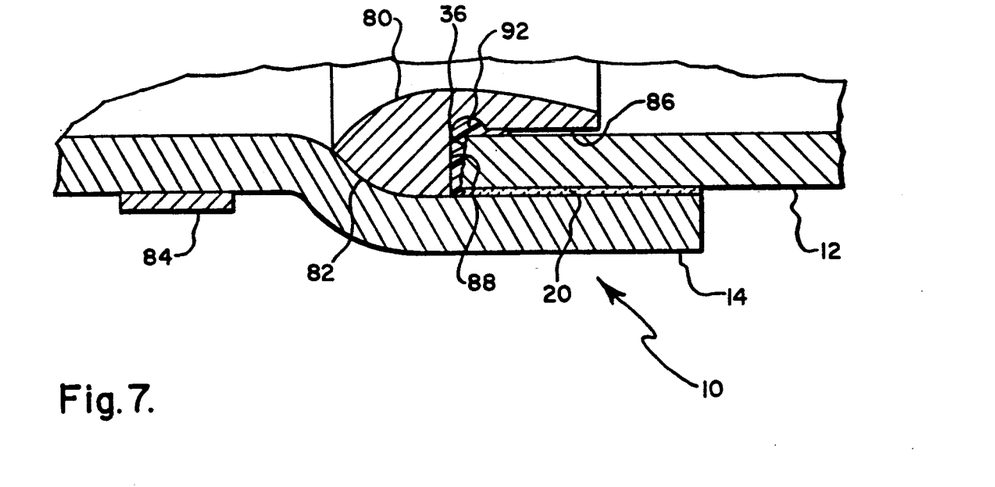
FIG. 7 is a view similar to that of FIG. 4 of the pipe joint of FIG. 6 assembled and soldered.

FIGS. 6 and 7 illustrate another embodiment of the present invention. In this embodiment, lead stop 80, which may be similar to lead stops 24 or 26, has a surface 82 sized and configured so that it is cold press-fit within the outer pipe portion 14 so that the pipe may be advantageously sold with the lead stop installed therein. A suitable indicator 84, serving to indicate to a pipe line installer and to a consumer that the lead stop 80 is contained within the pipe, may be suitably applied to the pipe near pipe portion 14. For example, the indicator 84 may be perhaps a green copper or green plastic band.

Since the inner pipe portion 12 must be fixed to lead stop 80 while lead stop 80 is within pipe portion 14, it may be less easy to press-fit the pipe portion 12 to lead stop 80. This may require that the cylindrical surface 86 be sized to have a slightly lesser diameter than would be required for the similar surfaces 30 and 52 of the lead stops of FIGS. 1 and 4 respectively. This may result in a greater likelihood of solder reaching the joint interior for contact with water flow by passing between surface 86 and the inner surface of the inner pipe portion 12. In order to prevent such flow, in accordance with a preferred embodiment of this invention a ring 92 of a suitable non-contaminating thermoplastic or thermosetting material is provided about surface 86 adjacent the radial surface 88 of lead stop 80 so that when inner pipe portion 12 is inserted between outer pipe portion 14 and surface 86, the ring 92 is located between surface 88 and the end 36 of the inner pipe portion 12. The ring of thermoplastic or thermosetting material 92 may preferably comprise, as essential ingredients, a polymeric organosilicon oxide binder and a finely divided refractory inorganic substance in an amount equal perhaps to at least 25% by weight of the organosilicon oxide. Such a composition is described in the aforesaid Jennings et al U.S. Pat. No. 2,473,887 which patent is hereby incorporated herein by reference.

As illustrated in FIG. 7, upon application of soldering heat, the thermoplastic material 92 softens so that the inner pipe portion 12, the end 36 of which, as shown, may be uneven, may be shoved into the softened mass 92 to abut the lead stop surface 88 with the mass displaced thereabout. This allows the mass 92 to seal or increase the effectiveness of the barrier between the solder 20 and the joint interior, and the seal may then become permanent upon cooling of the joint.

Figure 8:
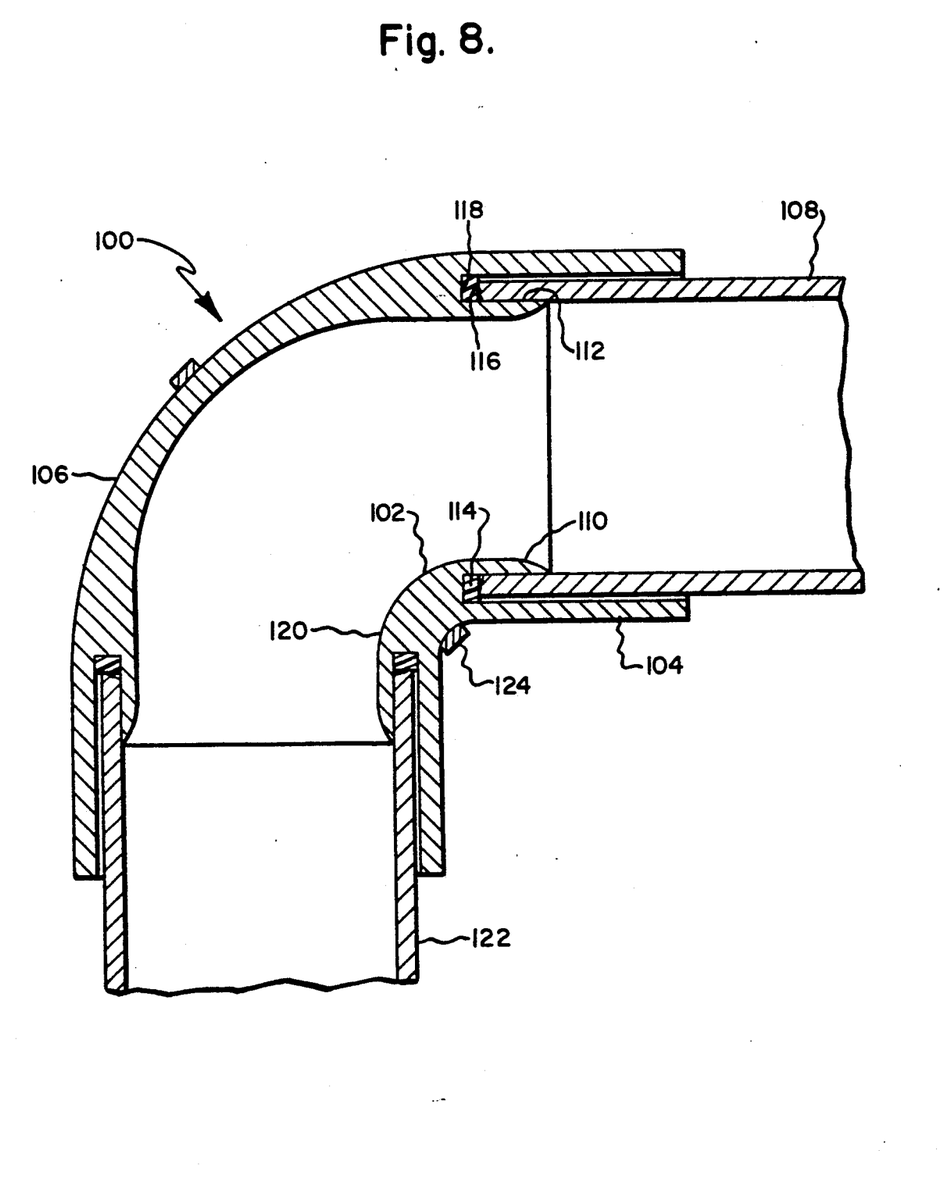
FIG. 8 is a view similar to that of FIG. 1 of yet another embodiment of the present invention, the pipe joint thereof being assembled for soldering.

FIG. 8, which shows a joint 100 assembled for soldering, illustrates yet another embodiment of the present invention wherein a lead stop 102 is suitably formed such as by casting integral with a pipe portion 104. In this embodiment, pipe portion 104 is illustrated as being part of a piping elbow 106, but the principles thereof may be applied to the provision of a lead stop integral with other types of piping connectors or with straight lengths of piping. Inner pipe portion 108 is insertable, as shown, between an axially directed lead stop portion 110 and outer pipe portion 104 which is integral with lead stop 102. Portion 110 contains axially extending surface 112, which may be similar to surface 86 of lead stop 80, for engaging the inner surface of pipe portion 108. Since the lead stop 102 is integral with pipe portion 104, it has no surface equivalent to surface 82 of lead stop 80 along which solder may otherwise undesirably flow for contact by fluid flowing through the joint 100. In order to prevent the flow of solder between surface 112 and the inner surface of the inner pipe portion 108 for contact with fluid flowing through the joint, a band of thermoplastic material 114, which may be similar to band 92 of FIG. 6, is provided between surface 112 and pipe portion 104 and so as to be disposed between the end 116 of the pipe portion 108 and the surface 118, which extends radially similarly as surface 88 of lead stop 80. During the soldering of the joint, the heat of soldering causes the thermoplastic material 114 to soften so that the inner pipe portion may be shoved into the mass of material to abuttingly engage surface 118. The mass of material 114 is thus provided to act as a barrier to seal the passage between the inner pipe portion 108 and surface 112 so that the solder is not positioned for contact by fluid flowing through the joint 100. Upon removal of the soldering heat, the mass of material 114 hardens, binding to the metal surfaces, to form a permanent seal or barrier to the flow of solder or its contact with water flow. The other end of elbow 106 may also contain an integral lead stop portion 120, similar to lead stop portion 102, for providing a similar barrier when a second pipe 122 is attached to elbow 106. A suitable indicator 124, similar to indicator 84, may be applied about the elbow 106 to indicate to a piping installer and to a consumer that the elbow contains lead stops.

Referring again to FIG. 5, in accordance with another embodiment of the present invention lead stop 28 is composed of a thermoplastic material 130, which may be similar to the material of which ring 92 is composed, which is encased along its inner surface 71 in a housing 132 composed of sheet metal or other suitable material which serves as a boundary for the material 130 when softened. During heating of the joint for soldering, the thermoplastic material 130 softens and is retained while so softened in position by the housing 132. At this time inner pipe portion 12 may be shoved further into the outer pipe portion 14 and into the mass of material 130 to insure a good seal upon cooling of the joint. Upon removal of the soldering heat, the mass of material 130 hardens, binding to the metal surfaces, to form a permanent seal or barrier to the flow of solder or its contact with water flow. Because the material 130 is self-forming, it may be sized for a tighter fit during assembly.

It should be understood that while the invention has been described in detail herein in at least five different embodiments, the invention can be embodied otherwise without departing from the principles thereof, and such other embodiments are meant to come within the scope of the present invention as defined by the appended claims.

What is claimed is:

1. An article for providing a barrier between solder, bonding an inner pipe portion to an outer pipe portion to form a joint, and the interior of the joint, the article comprising an annular member, means for fitting said annular member to the inner pipe portion, means defining a central opening in said annular member for providing passage of fluid flowing in the pipe joint, and means defining a portion on said annular member for abutting an end of the inner pipe portion and for extending radially outwardly beyond the outer surface of the inner pipe portion for providing a barrier between an annulus between the inner and outer pipe portions and the interior of the joint.

2. An article according to claim 1 wherein said annular member is sized to have a diameter which is greater than the diameter of the inner surface of the outer pipe portion and is composed of a malleable material which allows the annular member to deform for insertion of the inner pipe portion, with the annular member fitted thereto, within the outer pipe portion whereby the annular member may comformably engage the inner surface of the outer pipe portion.

3. An article according to claim 1 wherein said annular member is composed of a material which has a durometer hardness which is between about 70 and 300.

4. An article according to claim 1 wherein said annular member is composed of a material which as a durometer hardness which is between about 70 to 150.

5. An article according to claim 1 wherein said annular member is composed of a material selected from the group of materials consisting of a ceramic refractory material, plastic, and a non-lead alloy bronze.

6. An article according to claim 1 wherein said annular member is sized for press-fitting within the outer pipe portion.

7. An article according to claim 1 wherein said annular member is integral with one of the pipe portions.

8. An article according to claim 1 wherein said means for fitting said annular member to said inner pipe portion comprises a cylindrical surface on said annular member which has a diameter equal substantially to the diameter of the inner surface of the inner pipe portion whereby the annular member may be press fit to the inner pipe portion.

9. An article according to claim 8 further comprising means defining an indent in said cylindrical surface adjacent said radially outwardly extending portion for maintaining the annular member alignment on the inner pipe portion.

10. An article according to claim 1 further comprising a sleeve means installable about the inner pipe portion for indicating that the joint contains said annular member, and a removable cylindrical spacer member disposable about the inner pipe portion during installation of the article and having a first end portion to which said annular member is detachably attached and a second end portion to which said sleeve means is detachably attached.

11. An article according to claim 10 wherein said spacer member is composed of cardboard and is bonded to said annular member and said sleeve means.

12. An article according to claim 10 wherein said sleeve means and said annular member are composed of the same material.

13. An article according to claim 1 comprising a cylindrical surface on said annular member which has a diameter equal substantially to the diameter of the inner surface of the inner pipe portion for engaging the inner surface of the inner pipe portion, the article further comprising a ring of thermoplastic or thermosetting material about a portion of said cylindrical surface and abutting said radially extending portion whereby the end of the inner pipe portion may be inserted between the cylindrical surface and the outer pipe portion and pushed into the ring of thermoplastic material which is softened upon heating during soldering of the pipe portions together for sealing engagement of said inner pipe portion and said radially extending portion.

14. An article, according to claim 13 wherein said thermoplastic or thermosetting material is composed of polymeric organosilicon oxide and inorganic refractory material.

15. An article according to claim 1 wherein said annular member is composed of a malleable material and includes means defining a plurality of serrations for embeddingly engaging the outer pipe portion at a location thereof wherein the inner diameter thereof begins to decrease.

16. An article according to claim 1 wherein said annular member is composed of thermoplastic or thermosetting material and includes an annular housing forming a radially inner surface thereof for containing the thermoplastic or thermosetting material when heated whereby upon cooling to provide a seal between solder and the joint interior.

17. A pipe joint comprising an inner pipe portion having an end and an outer diameter, an outer pipe portion having an inner diameter which is greater than said outer diameter to define an annulus between said inner and outer pipe portions, solder in said annulus bonding said inner and outer pipe portions, means for providing a barrier between said solder and a fluid flowing through the joint, said barrier means comprising an annular member disposed in abutting relation to said end of said inner pipe portion and having a diameter which is greater than said inner pipe portion outer diameter and which is equal substantially to said outer pipe portion inner diameter, and means defining a central opening in said annular member for passage of fluid flowing through the pipe joint.

18. A pipe joint according to claim 17 wherein said annular member is composed of a malleable material and includes means defining a plurality of serrations for embeddingly engaging the outer pipe portion at a location thereof wherein the inner diameter thereof begins to decrease.

19. A pipe joint according to claim 17 further comprising means defining a cylindrical surface on said annular member and having a diameter equal substantially to the diameter of said inner surface of said inner pipe portion, said annular member being press fit to said inner surface of said inner pipe portion.

20. A pipe joint according to claim 17 wherein said annular member is composed of a malleable material which allows the annular member to deform for insertion of said inner pipe portion, with said annular member fitted thereto and abutting said end thereof and having a diameter which is greater than the diameter of the inner surface of the outer pipe portion, within the outer pipe portion whereby the annular member comformably engages the inner surface of the outer pipe portion.

21. A pipe joint according to claim 17 wherein said annular member is composed of a material which has a durometer hardness which is between about 70 and 300.

22. A pipe joint according to claim 17 wherein said annular member is composed of a material which has a durometer hardness which is between about 70 and 150.

23. A pipe joint according to claim 17 further comprising means on one of said pipe portions for indicating that said annular member is installed in the pipe joint.

24. A pipe joint according to claim 17 wherein said annular member is press-fit within said outer pipe portion.

25. A pipe joint according to claim 17 wherein said annular member is integral with said outer pipe portion.

26. A pipe joint according to claim 17 wherein said annular member is composed of a non-lead alloy bronze having a durometer hardness which is between about 70 and 300.

27. A pipe joint according to claim 17 further comprising thermoplastic or thermosetting sealingly engaging said annular member and said end of said inner pipe portion. 7.

28. A pipe joint according to claim 27 wherein said thermoplastic or thermosetting material ia composed of polymeric organosilicon oxide and inorganic refractory material.

29. A pipe joint according to claim 11 wherein said annular member is composed of thermoplastic or thermosetting material and includes an annular housing forming a radially surface thereof for containing the thermoplastic material when heated whereby upon cooling to provide a seal between solder and the joint interior.

30. A method of bonding an inner and an outer pipe portion to form a joint, the method comprising attaching to an end of the inner pipe portion an annular member which has an outer diameter which is greater than the outer diameter of the inner pipe portion and which is substantially equal to the inner diameter of the outer pipe portion, inserting the inner pipe portion with the annular member attached within the outer pipe portion, and flowing molten solder into the annulus between the inner and outer pipe portions for bonding thereof whereby the annular member provides a barrier between the solder and the joint interior.

31. A method according to claim 30 further comprising providing the annular member to have an outer diameter which is greater than the inner diameter of the outer pipe portion and to be composed of a malleable material which allows the annular member to deform for insertion of the inner pipe portion, with the annular member attached, within the outer pipe portion.

32. A method according to claim 30 further comprising providing means on one of the pipe portions for indicating that the annular member is installed in the joint.

33. A method according to claim 30 further comprising providing a plurality of deformable serrations on the annular member to engage the outer pipe portion, during insertion in the outer pipe portion, at a location thereof at which the inner diameter thereof begins to decrease.

34. A method according to claim 30 further comprising inserting a ring of thermoplastic or thermosetting material between the end of the inner pipe portion and the annular member for forming a seal therebetween in response to the heat for bonding the pipe portions.

35. A method according to claim 30 further comprising selecting the annular member to be composed of thermoplastic or thermosetting material and having an annular housing forming a radially inner surface thereof for containing the thermoplastic or thermosetting material when heated whereby upon cooling to provide a seal between the solder and the joint interior.

36. A method of bonding an inner and an outer pipe portion to form a joint, the method comprising attaching within the outer pipe portion an annular member which has an outer diameter which is greater than the outer diameter of the inner pipe portion and which is substantially equal to the inner diameter of the outer pipe portion and which has a cylindrical surface the diameter of which is less than the inner diameter of the outer pipe portion to define an annulus between the circumferential surface and the inner surface of the outer pipe portion, inserting a ring of thermoplastic material within the annulus to abut the annular member, inserting the inner pipe portion in the annulus to abut the ring, and flowing molten solder into the annulus between the inner and outer pipe portions for bonding thereof whereby the thermoplastic material softens, pushing the inner pipe portion toward the annular member and thereby into the softened thermoplastic material whereby the thermoplastic material may form a seal between the inner pipe portion and the annular member.

37. A method according to claim 36 comprising forming the annular member integrally with the outer pipe portion.

38. A method according to claim 36 comprising press fitting the annular member within the outer pipe portion.

39. A method according to claim 36 further comprising providing means on one of the pipe portions for indicating that the annular member is installed in the joint.

* * * * *